(12) United States Patent
Natsume

(10) Patent No.: US 7,242,170 B1
(45) Date of Patent: Jul. 10, 2007

(54) CONTROL CIRCUIT HAVING ERROR AMPLIFIER FOR DC-DC CONVERTER AND CONTROL METHOD THEREFOR

(75) Inventor: Masahiro Natsume, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/278,822

(22) Filed: Apr. 6, 2006

(30) Foreign Application Priority Data

Jan. 9, 2006 (JP) ............................. 2006-001944

(51) Int. Cl.
*G05F 1/00* (2006.01)
(52) U.S. Cl. ..................... 323/222; 323/224; 323/285
(58) Field of Classification Search ................ 323/222, 323/224, 282, 284, 285, 286
See application file for complete search history.

(56) References Cited

U.S. PATENT DOCUMENTS 5,396,165 A * 3/1995 Hwang et al. ............... 323/210
5,818,707 A * 10/1998 Seong et al. .................. 363/89
6,987,378 B1 * 1/2006 Steele ......................... 323/222

FOREIGN PATENT DOCUMENTS

JP 2005-117784 A 4/2005

* cited by examiner

*Primary Examiner*—Bao Q. Vu
(74) *Attorney, Agent, or Firm*—Arent Fox LLP (57) ABSTRACT

A control circuit for DC-DC converters and a control method therefor wherein unstable operation in which output voltage fluctuates can be detected and the unstable operation be prevented from continuing are provided. The control circuit includes: an error amplifier ERA1 that has an inverting input terminal to which detecting voltage V1 detected according to output voltage is inputted and a non-inverting input terminal to which reference voltage e1 is inputted, and amplifies the difference voltage of detecting voltage relative to reference voltage e1; and a detection unit 50 that detects that an error output signal VOP of the error amplifier ERA1 stays at a predetermined voltage level. The detection unit 50 includes: a signal determination unit that determines that the predetermined voltage level is out of a normal operating range; and a duration count unit that detects that the predetermined voltage level stays out of the normal operating range for a predetermined time by the signal determination unit.

8 Claims, 7 Drawing Sheets

CIRCUITRY DIAGRAM OF STEP-DOWN DC-DC CONVERTER IN FIRST EMBODIMENT OF THE INVENTION

FIG. 1 CIRCUITRY DIAGRAM OF STEP-DOWN DC-DC CONVERTER IN FIRST EMBODIMENT OF THE INVENTION

FIG. 2 CIRCUITRY DIAGRAM OF LOGIC CIRCUIT INCORPORATED IN STEP-DOWN DC-DC CONVERTER

FIG. 3

TIMING CHART OF SIGNAL WAVEFORM OF STEP-DOWN DC-DC CONVERTER

FIG. 4 CIRCUITRY DIAGRAM OF STEP-DOWN DC-DC CONVERTER IN SECOND EMBODIMENT

FIG. 5 CIRCUITRY DIAGRAM OF STEP-UP DC-DC CONVERTER IN THIRD EMBODIMENT

FIG. 6

CIRCUITRY DIAGRAM OF DC-DC CONVERTER THAT OUTPUTS NEGATIVE VOLTAGE IN FOURTH EMBODIMENT

FIG. 7 (PRIOR ART)
CIRCUITRY DIAGRAM OF CONVENTIONAL STEP-DOWN DC-DC CONVERTER

US 7,242,170 B1

CONTROL CIRCUIT HAVING ERROR AMPLIFIER FOR DC-DC CONVERTER AND CONTROL METHOD THEREFOR

CROSS-REFERENCE TO RELATED APPLICATIONS

This application is based upon and claims the benefit of priority from each of the prior Japanese Patent Application No. 2006-001944 filed on Jan. 9, 2006, the entire contents of which are incorporated herein by reference.

BACKGROUND OF THE INVENTION

1. Field of the Invention

The present invention relates to a control circuit for DC-DC converters and a control method therefor.

2. Description of Related Art

Portable electronic equipment uses a battery, such as electric cell, as power source. The power of a battery is discharged as time passes after the portable electronic equipment is actuated, and the output voltage of the battery drops with time. DC-DC converters have been used to keep power supply voltage, supplied to portable electronic equipment, constant even after the output voltage of its battery drops.

Portable electronic equipment is connected with various devices. Therefore, it is required to prepare multiple DC-DC converters in correspondence with the target voltages of devices connected with the relevant portable electronic equipment.

To avoid preparing a separate control IC having specific characteristics for each operating condition of DC-DC converters and provide versatility, some of such portable electronic equipment are so constructed that the following is implemented: a resistance element and a capacitive element that establish operating conditions are externally added to a control IC.

Portable electronic equipment is often moved from one installation position to another when used indoors or is often taken out when used. When it is moved or taken out, it may be accidentally dropped. In such a case, troubles can be caused by dropping impact. For example, a resistance element or a capacitive element externally added to a control IC can come off or be loosened. As a result, they are not electrically connected with the control IC, or failure is produced in the electrical connection between the control IC and the resistance element or the like. As a result, a state of overvoltage in which output voltage is abruptly increased, for example, may be brought about.

Japanese Unexamined Patent Publication No. 2005-117784 discloses a technique to prevent occurrences of overvoltage. In the switching power supply unit described in this document, output voltage drop is prevented by taking the following measures: an IC for switching power supply compares reference voltage generated by a charging circuit with feedback voltage from an output circuit; and it brings the value of this feedback voltage close to the value of the reference voltage. When the IC for switching power supply is no longer electrically connected with the output circuit due to connection failure, for example, the following takes place: the value of feedback voltage from the output circuit is zeroed, and the difference between the value of feedback voltage and the value of reference voltage is increased. Consequently, the IC for switching power supply carries out control so as to bring the value of feedback voltage close to the value of reference voltage. As a result, output voltage rises, and overvoltage is caused. In this switching power supply unit, consequently, output voltage is prevented from rising by taking the following measures: when the value of feedback voltage lowers and the occurrence of a failure is detected, a switch means connected with an output terminal is turned off.

Figure 7:
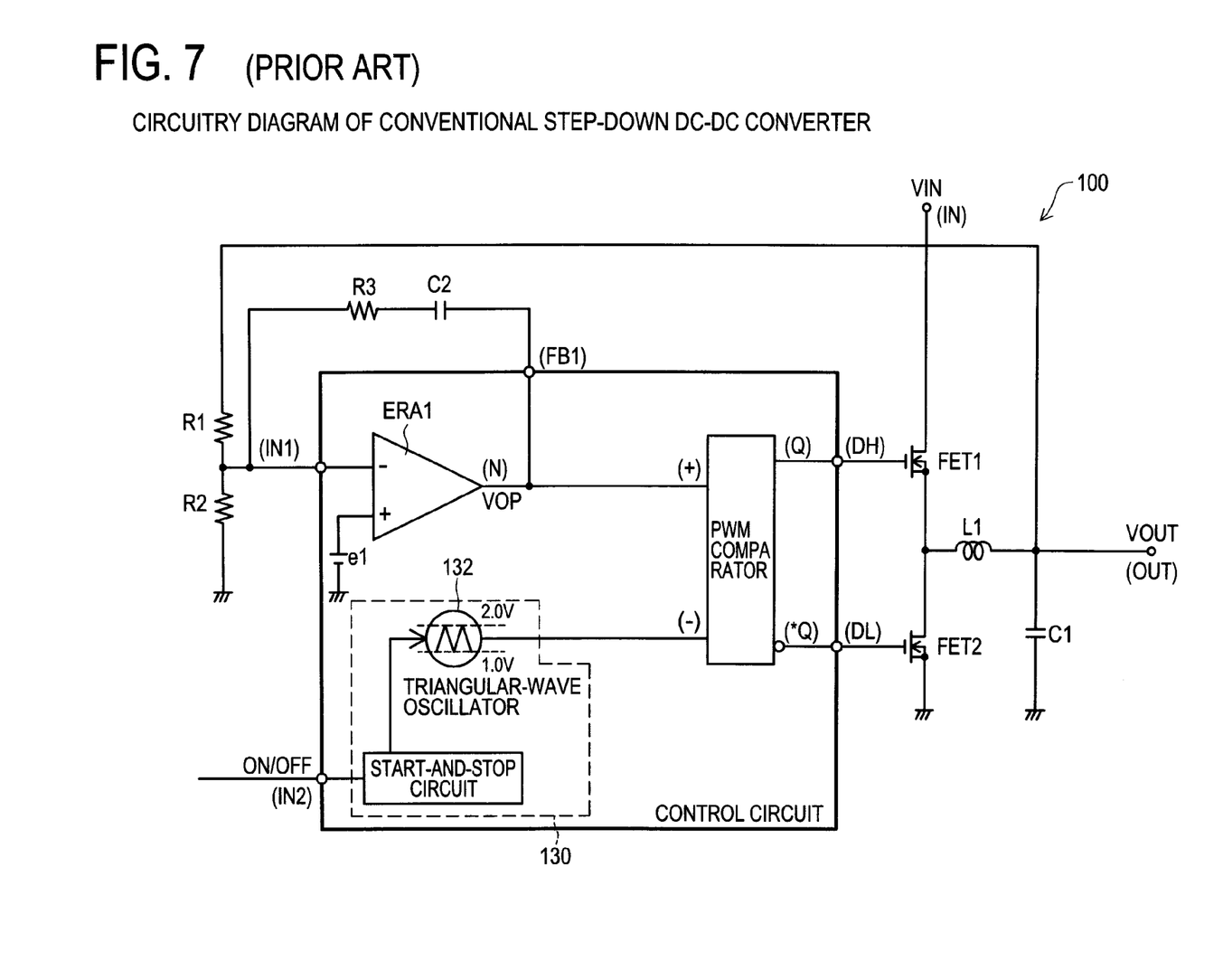
FIG. 7 is a circuitry diagram of a conventional step-down DC-DC converter.

Some of the above-mentioned portable electronic equipment are provided with a DC-DC converter 100 illustrated in FIG. 7, for example. A resistor R3 and a capacitor C2 are externally added to a control circuit, and the feedback path for an error amplifier ERA1 is constructed of the resistor R3 and the capacitor C2.

SUMMARY OF THE INVENTION

Also, in the portable electronic equipment illustrated in FIG. 7, the similar operation is performed. That is, in cases where it is dropped when moved or taken out, the resistor R3 or the capacitor C2 comes off due to impact, and the feedback path for the error amplifier ERA1 cannot be constructed. Therefore, the error amplifier ERA1 does not carry out an error amplifying function. It operates as a voltage comparator, and compares voltage obtained by dividing output voltage VOUT with resistors R1 and R2 with reference voltage e1. In the portable electronic equipment illustrated in the drawing, the following takes place: when the voltage at an input terminal (IN1), obtained by dividing output voltage VOUT with the resistors R1 and R2, drops below reference voltage e1, the output voltage of the error amplifier (voltage amplifier) ERA1 becomes the maximum voltage it can output. When the voltage at the input terminal (IN1), obtained by dividing output voltage VOUT with the resistors R1 and R2, rises above reference voltage e1, the output voltage of the error amplifier (voltage amplifier) ERA1 becomes the minimum voltage it can output. In general, the maximum voltage of the output voltage of an error amplifier ERA1 is higher than the peak voltage value of a triangular-wave oscillator 132. The minimum voltage is lower than the bottom voltage value of the triangular-wave oscillator 132. When a PWM comparator determines that the output voltage of the error amplifier (voltage amplifier) ERA1 is higher than the output voltage of the triangular-wave oscillator 132, it outputs a high-level PWM signal to turn on a main switching transistor FET1. When it determines that the output voltage of the error amplifier (voltage amplifier) ERA1 is lower than the output voltage of the triangular-wave oscillator 132, it outputs a low-level PWM signal to turn off the main switching transistor FET1. Therefore, when the resistor R3 or the capacitor C2 comes off, it turns on or off the main switching transistor FET1 for that reason regardless of the oscillating frequency of the triangular-wave oscillator 132. For this reason, an oscillation phenomenon in which output voltage VOUT fluctuates occurs when the main switching transistor FET1 is repeatedly turned on and off. There are concerns that output voltage VOUT fluctuates beyond the control range of the DC-DC converter and the operation of the DC-DC converter is destabilized.

The invention has been made with the foregoing taken into account. An object of the invention is to provide a control circuit for DC-DC converters and a control method therefor wherein unstable operation in which output voltage fluctuates can be detected and continuance of unstable operation be prevented.

According to a first aspect of the present invention, there is provided a control circuit for DC-DC converters, comprising: an error amplifier that has an inverting input terminal to which detecting voltage detected according to output voltage is inputted and a non-inverting input terminal to which reference voltage is inputted, and amplifies the voltage difference of the detecting voltage relative to the reference voltage; and a detection unit that detects that an error output signal of the error amplifier stays at a predetermined voltage level.

In a control circuit for DC-DC converters according to a first aspect of the invention, the following operation is performed: when the control circuit of a DC-DC converter is in normal control state, control is carried out in correspondence with the difference voltage of detecting voltage from reference voltage; as a result, the error output signal of an error amplifier is prevented from staying at a predetermined voltage level, and output voltage is controlled to a target voltage.

When the control circuit of the DC-DC converter is in abnormal control state, a detection unit detects that the error output signal of the error amplifier is staying at the predetermined voltage level. Based on that the error output signal is staying at the predetermined voltage level, it can be detected that output voltage is an abnormal voltage beyond the control range.

According to a second aspect of the present invention, there is provided a control method for DC-DC converters, wherein, after detecting voltage detected according to output voltage is compared with reference voltage, an error output signal obtained by amplifying the difference voltage of the detecting voltage relative to the reference voltage is outputted, and wherein it is detected that the error output signal stays at a predetermined voltage level.

In a control method for DC-DC converters according to the first aspect of the invention, the following operation is performed: when a DC-DC converter is in normal control state, control is carried out in correspondence with the difference voltage of detecting voltage from reference voltage; as a result, the error output signal is prevented from staying at a predetermined voltage level, and output voltage is controlled to a target voltage.

When the DC-DC converter is in abnormal control state, it is detected that the error output signal is staying at the predetermined voltage level. Based on that the error output signal is staying at the predetermined voltage level, it can be detected that output voltage is an abnormal voltage beyond the control range.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
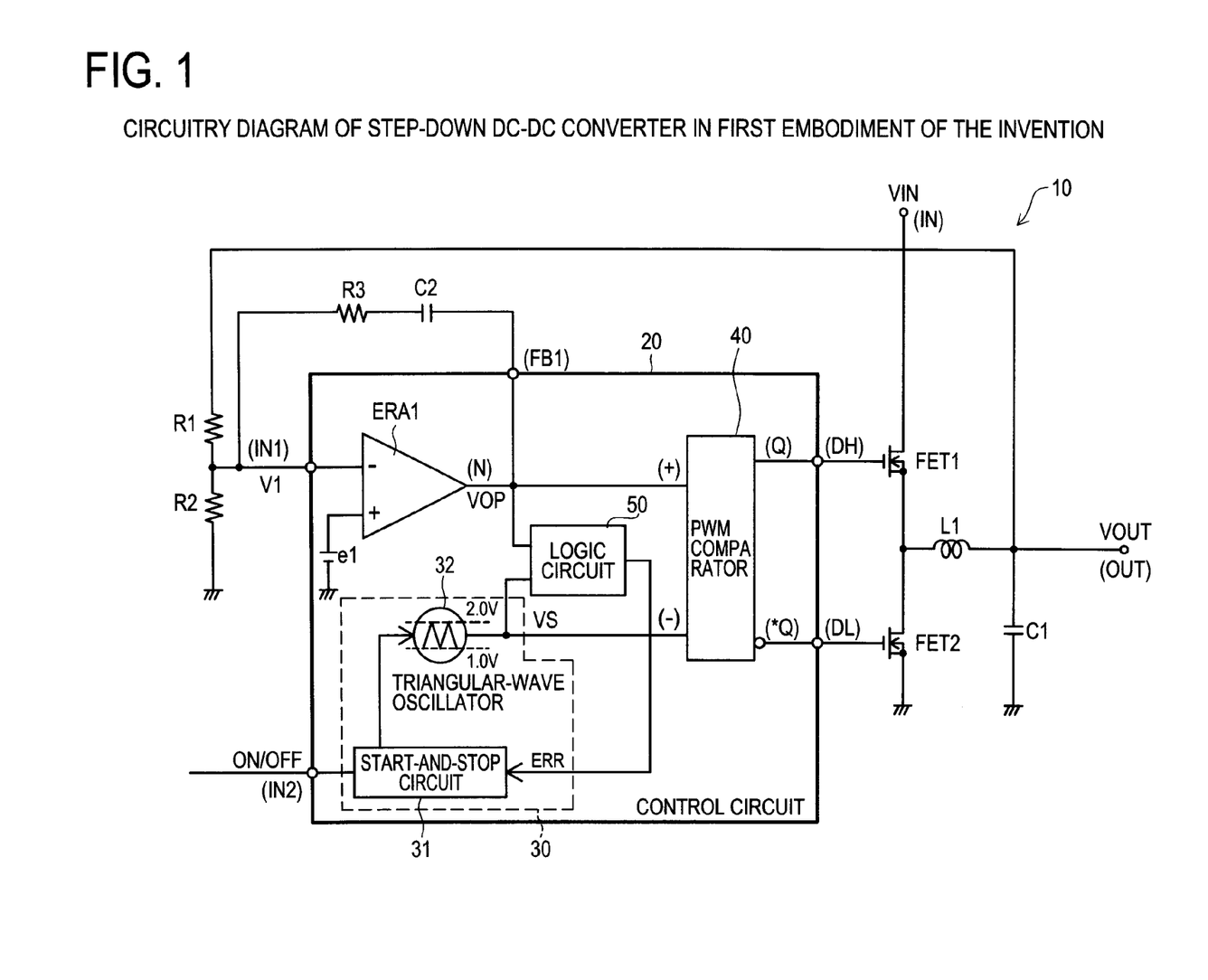
FIG. 1 is a circuitry diagram of a step-down DC-DC converter in a first embodiment of the invention.

Description will be given to the control circuit for DC-DC converters and the control method therefor according to the invention with reference to the embodiments illustrated in FIG. 1 to FIG. 6. FIG. 1 is a circuitry diagram of a step-down DC-DC converter 10 in a first embodiment. As illustrated in the drawing, the step-down DC-DC converter 10 includes a main switching transistor FET1, a synchronization switching transistor FET2, a choke coil L1, and a capacitor C1.

As illustrated in the drawing, the main switching transistor FET1 has a drain to which an input terminal (IN) is connected, and direct-current input voltage VIN is applied to it through the input terminal (IN). The source of the main switching transistor FET1 is connected to the drain of the synchronization switching transistor FET2. The source of the synchronization switching transistor FET2 is connected to ground. The source of the main switching transistor FET1 and the drain of the synchronization switching transistor FET2 are connected to the choke coil L1. This choke coil L1 is connected to an output terminal (OUT). The capacitor C1 is connected between the output terminal (OUT) and ground.

In this step-down DC-DC converter 10, as illustrated in the drawing, a resistor R1 and a resistor R2 are connected in series, and the resistors R1 and R2 are connected between the output terminal (OUT) and ground. This step-down DC-DC converter 10 has a control circuit 20. This control circuit 20 is constructed of an IC (integrated circuit). The control circuit 20 in the first embodiment includes an error amplifier ERA1, an oscillation circuit 30, a PWM comparator 40, and a logic circuit 50. The error amplifier ERA1 is equivalent to the error amplifier in the invention, and the logic circuit 50 is equivalent to the detection unit in the invention.

The error amplifier ERA1 has an inverting input terminal to which the junction point between the resistor R1 and the resistor R2 is connected through the input terminal (IN1). Voltage V1 obtained by dividing output voltage VOUT with the resistors R1 and R2 is applied to this inverting input terminal. Voltage V1 is equivalent to the detecting voltage in the invention.

The error amplifier ERA1 has reference voltage e1 applied to its non-inverting input terminal. The value of reference voltage e1 is so set that the following is implemented: when the value of output voltage VOUT is equal to a target voltage value, the value of reference voltage e1 is equal to the value of voltage V1 applied to the inverting input terminal. The output terminal (N) of the error amplifier ERA1 is connected to a terminal (FB1) of the control circuit 20. A feedback capacitor C2 and a feedback resistor R3 are connected in series between the terminal (FB1) and the input terminal (IN1). As illustrated in the drawing, the feedback capacitor C2 and the feedback resistor R3 are externally added to the control circuit 20.

Figure 3:
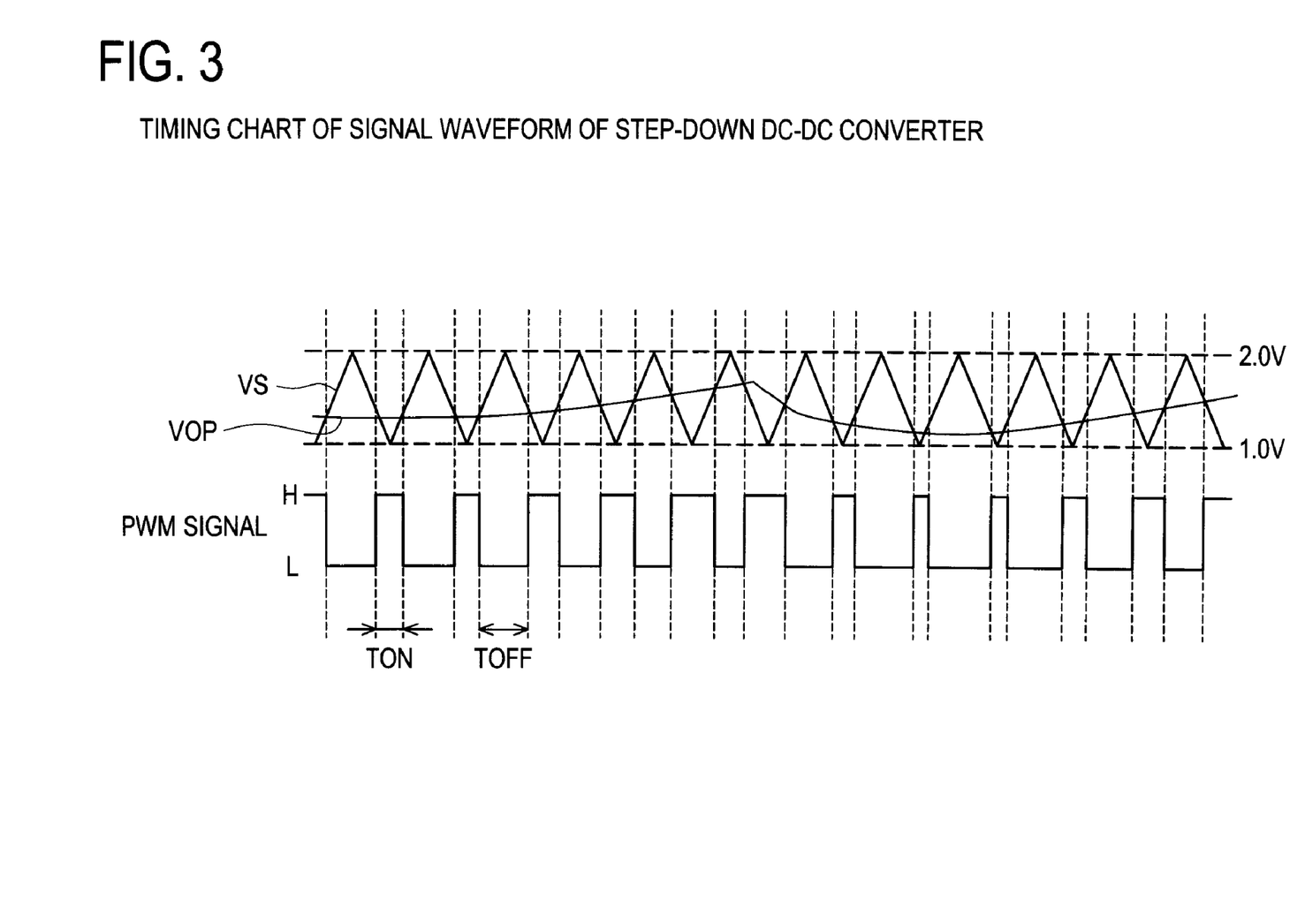
FIG. 3 is a timing chart of the signal waveform of the step-down DC-DC converter.

The oscillation circuit 30 includes a start-and-stop circuit 31 and a triangular-wave oscillator 32. The start-and-stop circuit 31 cited here is, for example, an internal power supply circuit that supplies the control circuit 20 with power according to an activation control signal ON/OFF. As illustrated in FIG. 1 and FIG. 3, the oscillation circuit 30 outputs a triangular-wave signal VS. As illustrated in the drawings, this triangular-wave signal VS oscillates within a certain range of voltage value (between 1.0V and 2.0V in this example). The start-and-stop circuit 31 is supplied with the activation control signal ON/OFF through an input terminal (IN2). The triangular-wave oscillator 32 is constructed using, for example, OP amplifier, resistor, capacitor, and the like.

As illustrated in FIG. 1, the PWM comparator 40 has a positive input terminal (+) and a negative input terminal (−). This positive input terminal (+) is connected to the output terminal (N) of the error amplifier ERA1.

The negative input terminal (−) of the PWM comparator 40 is connected to the triangular-wave oscillator 32. An output terminal (Q) of the PWM comparator 40 is connected to the gate of the main switching transistor FET1 through a non-inverting output terminal (DH). An output terminal (*Q) of the PWM comparator 40 is connected to the gate of the synchronization switching transistor FET2 through an inverting output terminal (DL).

Figure 2:
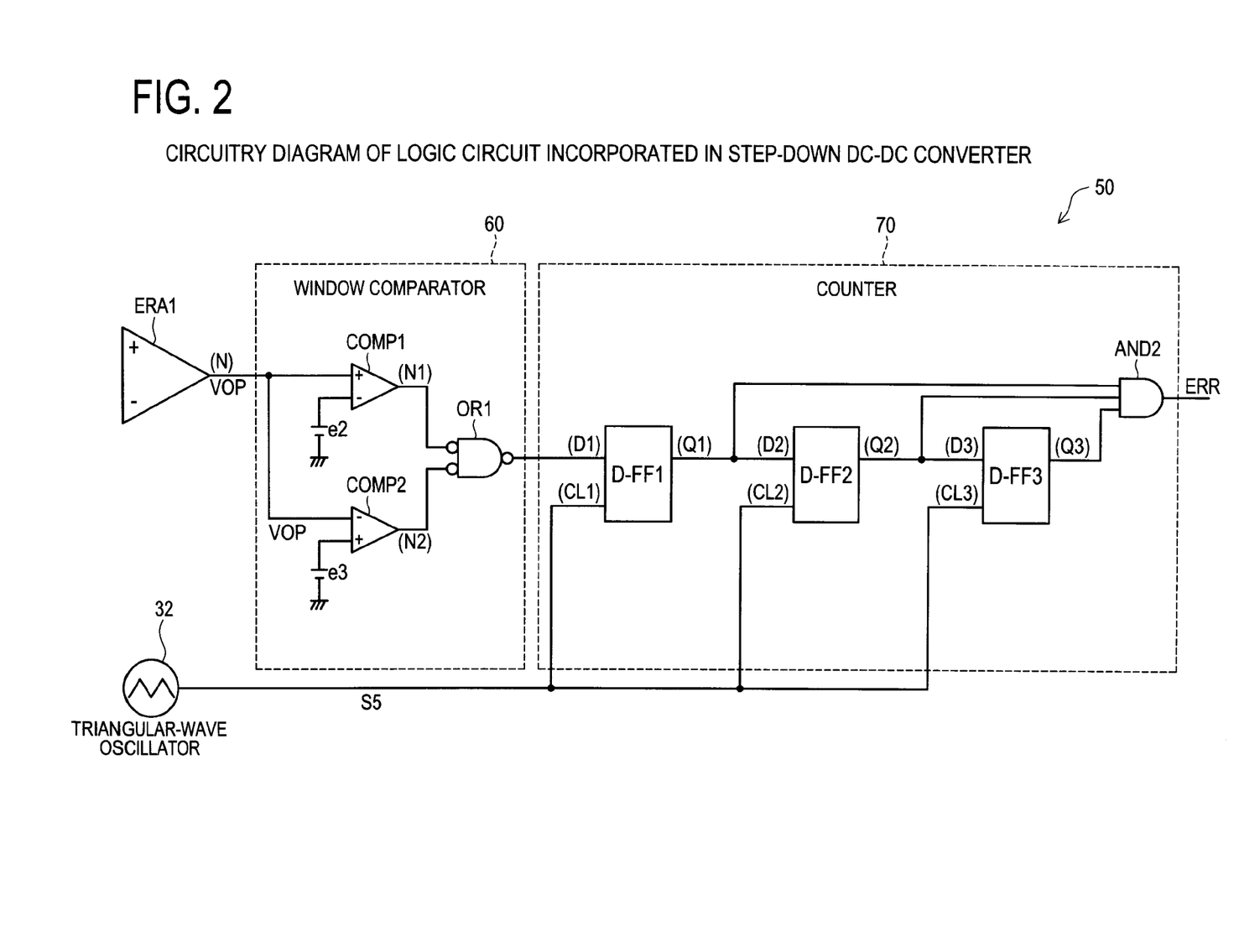
FIG. 2 is a circuitry diagram of the logic circuit incorporated in the step-down DC-DC converter.

As illustrated in the relevant drawing, the logic circuit 50 is connected to the output terminal (N) of the error amplifier ERA1 and the triangular-wave oscillator 32. As illustrated in FIG. 2, the logic circuit 50 is constructed of a window comparator 60 and a counter 70. The window comparator 60 is equivalent to the signal determination unit in the invention. This window comparator 60 includes a comparator COMP1, a comparator COMP2, and an OR gate circuit OR1. The comparator COMP1 is equivalent to the first comparison unit in the invention, and the comparator COMP2 is equivalent to the second comparison unit in the invention.

The non-inverting input terminal of the comparator COMP1 is connected to the output terminal (N) of the error amplifier ERA1. The comparator COMP1 has reference voltage e2 applied to its inverting input terminal. The value of this reference voltage e2 is so set that it is equal to the maximum voltage value of the triangular-wave signal VS (2.0V in this example). The output terminal (N1) of the comparator COMP1 is connected to the OR gate circuit OR1.

The inverting input terminal of the comparator COMP2 is connected to the output terminal (N) of the error amplifier ERA1. The comparator COMP2 has reference voltage e3 applied to its non-inverting input terminal. The value of this reference voltage e3 is so set that it is equal to the minimum voltage value of the triangular-wave signal VS (1.0V in this example). The output terminal (N2) of the comparator COMP2 is connected to the OR gate circuit OR1.

The counter 70 is equivalent to the duration count unit in the invention. This counter 70 includes D flip-flop circuits (D-FF1 to D-FF3) and an AND gate circuit AND2. The AND gate circuit AND2 is equivalent to the AND circuit in the invention.

The three D flip-flop circuits (D-FF1 to D-FF3) are connected in series. The input terminal (D1) of the D flip-flop D-FF1 is connected to the above-mentioned OR gate circuit OR1. The input terminal (D2) of the D flip-flop circuit D-FF2 is connected to the output terminal (Q1) of the D flip-flop circuit D-FF1. The input terminal (D3) of the D flip-flop circuit D-FF3 is connected to the output terminal (Q2) of the flip-flop circuit D-FF2. The output terminals (Q1 to Q3) of the D flip-flop circuits D-FF1 to D-FF3 are connected to the AND gate circuit AND2. The clock terminals (CL1 to CL3) of the D flip-flop circuits D-FF1 to D-FF3 are connected to the triangular-wave oscillator 32.

Description will be given to a control method for the step-down DC-DC converter 10. The step-down DC-DC converter 10 illustrated in FIG. 1 alternately on/off-controls the transistors FET1 and FET2, and thereby controls output voltage VOUT to a voltage lower than input voltage VIN. In this step-down DC-DC converter 10, the ratio (duty ratio) between the on time TON of the main switching transistor FET1 and the off time TOFF of the main switching transistor FET1 is varied. Output voltage VOUT can be thereby controlled to a target voltage value relative to input voltage VIN.

The relation between input voltage VIN and output voltage VOUT is expressed by the expression below.

$$VOUT = \{TON/(TON+TOFF)\} \times VIN$$

where, TON/(TON+TOFF) is duty ratio.

The resistors R1 and R2 divide output voltage VOUT, and the voltage V1 obtained as the result of division is fed back to the control circuit 20. The error amplifier ERA1 compares the voltage V1 with reference voltage e1, and outputs error output voltage VOP to the PWM comparator 40. This error output voltage VOP is obtained by inverting and amplifying the error voltage of voltage V1 relative to reference voltage e1. This error output voltage VOP is equivalent to the error output signal in the invention.

The triangular-wave oscillator 32 outputs a triangular-wave signal VS to the PWM comparator 40. As illustrated in FIG. 3, this triangular-wave signal VS oscillates within a certain range of voltage value (between 1.0V and 2.0V in this example).

The PWM comparator 40 is inputted with error output voltage VOP at its positive input terminal (+) and the triangular-wave signal VS at its negative input terminal (−). The PWM comparator 40 compares the error output voltage VOP with the value of the triangular-wave signal VS.

As illustrated in FIG. 3, the PWM comparator 40 operates as follows: when the error output voltage VOP is higher than the voltage value of the triangular-wave signal VS, it outputs a PWM signal of H level (high level) from its output terminal (Q). At this time, an inverted PWM signal of L level (low level) is outputted from the output terminal (*Q) When the error output voltage VOP is lower than the voltage value of the triangular-wave signal VS, the PWM comparator 40 outputs a PWM signal of L level (low level). At this time, the inverted PWM signal is at H level (high level).

When voltage V1 is lower than reference voltage e1, error output voltage VOP is increased, and the period for which a PWM signal is at H level (high level) (TON) is lengthened. As a result, the above duty ratio is increased, and output voltage VOUT rises. When voltage V1 is higher than reference voltage e1, error output voltage VOP is decreased, and the period for which a PWM signal is at L level (low level) (TOFF) is lengthened. As a result, the duty ratio is reduced, and output voltage VOUT drops.

The PWM signal is inputted to the gate of the main switching transistor FET1 through the non-inverting output terminal (DH). The main switching transistor FET1 is turned on when the PWM signal is at H level (high level) and turned off when it is at L level (low level). The inverted PWM signal is inputted to the gate of the synchronization switching transistor FET2 through the inverting output terminal (DL). The synchronization switching transistor FET2 is turned off when the inverted PWM signal is at L level (low level) and turned on when it is at H level (high level). The PWM signal repeatedly transitions between H level and L level at a predetermined duty, and at the same time, the inverted PWM signal repeatedly transitions between L level and H level at a predetermined duty. As a result, output voltage VOUT is controlled to a target voltage and is supplied to various devices through the output terminal (OUT).

When the capacitor C2 or the feedback resistor R3 comes off due to dropping impact, the step-down DC-DC converter 10 in this embodiment operates as follows. When the feedback capacitor C2 and the feedback resistor R3 are connected between the terminal (FB1) and the input terminal (IN1), the following takes place in the step-down DC-DC converter 10: error output voltage VOP fluctuates mainly within the normal operating range ranging from the minimum voltage value (1.0V) to the maximum voltage value (2.0V) of the triangular-wave signal VS, as illustrated in FIG. 3. That is, in cases where operation largely deviates from normal state due to abrupt fluctuation in load or the like, output voltage VOP can fluctuate and temporarily get out of the normal operating range. In normal state, this error output voltage VOP fluctuates within the normal operating range.

When at least any of the resistors R1 and R2, feedback capacitor C2, and feedback resistor R3 comes off, the following takes place as in the conventional step-down DC-DC converter 100, illustrated in FIG. 7: the error amplifier ERA1 causes error output voltage VOP to fluctuate within the range between the maximum voltage value and the minimum voltage value it can output, regardless of the maximum voltage value (2.0V) or minimum voltage value (1.0V) of the triangular-wave signal VS.

More specific description will be given. When the resistor R1 comes off, as is understandable from FIG. 1, the input terminal (IN1) is connected to ground. Voltage V1 is fixed at a voltage lower than reference voltage e1. Therefore, the error output voltage VOP outputted from the error amplifier ERA1 is fixed at a voltage higher than the maximum voltage value (2.0V) of the triangular-wave signal VS.

When at least either of the feedback capacitor C2 and the feedback resistor R3 comes off, the error amplifier ERA1 comes to operate as a comparator. Output voltage VOUT is detected by the error amplifier ERA1 and fluctuates by causing the transistors FET1 and FET2 to perform switching operation. This fluctuation is detected by the error amplifier ERA1 again. Output voltage VOUT is caused to fluctuate to polarity opposite to the polarity before fluctuation in output voltage VOUT is detected by the error amplifier ERA1 again. This operation is repeated, and voltage V1 oscillates with periodicity determined according to the feedback path for output voltage VOUT in the DC-DC converter 10. As a result, error output voltage VOP oscillates.

When the resistor R2 comes off, the input terminal (IN1) is connected to the output terminal (OUT). In this case, voltage V1 is fixed at a voltage higher than reference voltage e1. The error output voltage VOP outputted from the error amplifier ERA1 is fixed at a voltage lower than the minimum voltage value (1.0V) of the triangular-wave signal VS.

As illustrated in FIG. 2, this error output voltage VOP is inputted to the non-inverting input terminal of the comparator COMP1. The comparator COMP1 compares with the error output voltage VOP with reference voltage e2 (2.0V). When the error output voltage VOP is higher than reference voltage e2, this comparator COMP1 outputs a high-level signal. When error output voltage VOP is higher than reference voltage e2, the error output voltage VOP is above the maximum value (2.0V) of the above-mentioned normal operating range.

When the error output voltage VOP is lower than reference voltage e2, this comparator COMP1 outputs a low-level signal. When error output voltage VOP is lower than reference voltage e2, the error output voltage VOP is not above the maximum value (2.0V) of the above-mentioned normal operating range.

As illustrated in FIG. 2, the error output voltage VOP is inputted to the inverting input terminal of the comparator COMP2. The comparator COMP2 compares the error output voltage VOP with reference voltage e3 (1.0V). When the error output voltage VOP is lower than reference voltage e3, this comparator COMP2 outputs a high-level signal. When error output voltage VOP is lower than reference voltage e3, the error output voltage VOP is below the minimum value (1.0V) of the above-mentioned normal operating range.

When the error output voltage VOP is higher than reference voltage e3, this comparator COMP2 outputs a low-level signal. When error output voltage VOP is higher than reference voltage e3, the error output voltage VOP is above the minimum value (1.0V) of the above-mentioned normal operating range.

The OR gate circuit OR1 is inputted with signals outputted by both the comparators COMP1 and COMP2, and outputs the result of logic operation OR. When at least either of the inputted signals is a high-level signal, this OR gate circuit OR1 outputs a high-level signal. When error output voltage VOP gets out of the above-mentioned normal operating range and either of both the comparators COMP1 and COM2 outputs a high-level signal, the OR gate circuit OR1 outputs a high-level signal.

When all the inputted signals are low-level signals, the OR gate circuit OR1 outputs a low-level signal. When error output voltage VOP is within the above-mentioned normal operating range and both the comparators COMP1 and COMP2 output low-level signals, the OR gate circuit OR1 outputs a low-level signal.

When the OR gate circuit OR1 outputs a high-level signal, the counter 70 operates as follows: this high-level signal is inputted to the input terminal (D1) of the D flip-flop circuit D-FF1. The clock terminal (CL1) of this D flip-flop D-FF1 is inputted with a timing signal S5. This timing signal S5 is inputted to the clock terminal (CL1) in synchronization with the rising edge of the above-mentioned triangular-wave signal VS.

When the timing signal S5 is inputted to its clock terminal (CL1), the D flip-flop circuit D-FF1 stores the high-level signal outputted from the OR gate circuit OR1 and outputs it from its output terminal (Q1). The high-level signal outputted from the D flip-flop circuit D-FF1 is inputted to the input terminal (D2) of the D flip-flop circuit D-FF2 and the AND gate circuit AND2.

When the timing signal S5 is inputted to its clock terminal (CL2), the D flip-flop circuit D-FF2 stores the high-level signal outputted from the D flip-flop circuit D-FF1. It outputs the high-level signal from its output terminal (Q2) according to the next period of the timing signal S5. The high-level signal outputted from the D flip-flop circuit D-FF2 is inputted to the input terminal (D3) of the D flip-flop circuit D-FF3 and the AND gate circuit AND2.

When the timing signal S5 is inputted to its clock terminal (CL3), the D flip-flop circuit D-FF3 stores the high-level signal outputted from the D flip-flop circuit D-FF2. It outputs the high-level signal from its output terminal (Q3) according to the next period of the timing signal S5. The high-level signal outputted from the D flip-flop circuit D-FF3 is inputted to the AND gate circuit AND2.

When all the inputted signals are high-level signals, the AND gate circuit AND2 outputs an anomaly detection signal ERR of high level as logical product. When the error output voltage VOP is continuously kept out of the above-mentioned normal operating range (between 1.0V and 2.0V inclusive) for at least three oscillation periods of the triangular-wave oscillator 32 and the D flip-flop circuits D-FF1 to D-FF3 sequentially store and output a high-level signal, the AND gate circuit AND2 outputs the anomaly detection signal ERR.

As illustrated in FIG. 1, the anomaly detection signal ERR is inputted to the start-and-stop circuit 31. When the anomaly detection signal ERR is inputted, the start-and-stop circuit 31 stops supplying power to the triangular-wave oscillator 32. When power supply is stopped, the triangular-wave oscillator 32 stops generating the triangular-wave signal VS, and as a result, the operation of the oscillation circuit 30 stops.

In the step-down DC-DC converter 10 in this embodiment, thereafter, the PWM comparator 40 outputs a low-level PWM signal to the main switching transistor FET1 to turn off the main switching transistor FEF1 and zero the output voltage VOUT. Thus, unstable operation in which output voltage VOUT abnormally and continuously fluctuates can be prevented.

When error output voltage VOP fluctuates within the above-mentioned normal operating range (between 1.0V and 2.0V inclusive) and the D flip-flop circuits D-FF1 to D-FF3 sequentially store and output a low level signal, the counter 70 keeps the anomaly detection signal ERR at low level. Anomaly detection is not carried out.

When at least one of the resistors R1 and R2, feedback capacitor C2, and feedback resistor R3 comes off due to dropping impact or the like and output voltage VOUT is not kept at a target voltage, set by the error amplifier ERA1 according to reference voltage e1, and fluctuates, the step-down DC-DC converter 10 in the first embodiment can implement the following: it can be detected by the logic circuit 50 that error output voltage VOP is continuously kept out of the normal operating range ranging from the minimum voltage value (1.0V) to the maximum voltage value (2.0V) of the triangular-wave signal VS. Consequently, the step-down DC-DC converter 10 in the first embodiment can detect that the value of output voltage VOUT is not equal to a target voltage value.

When at least one of the resistors R1 and R2, feedback capacitor C2, and feedback resistor R3 comes off due to dropping impact or the like and output voltage VOUT is not kept at a target voltage, set by the error amplifier ERA1 according to reference voltage e1, and fluctuates, the control method for step-down DC-DC converters 10 can implement the following: it can be detected that error output voltage VOP is continuously kept out of the normal operating range ranging from the minimum voltage value (1.0V) to the maximum voltage value (2.0V) of the triangular-wave signal VS. Consequently, the control method for step-down DC-DC converters 10 can detect that the value of output voltage VOUT is not equal to a target voltage value.

When it is determined that error output voltage VOP is not within the normal operating range ranging from the minimum voltage value (1.0V) to the maximum voltage value (2.0V) of the triangular-wave signal VS, the step-down DC-DC converter 10 in this embodiment can implement the following: the window comparator 60 of the logic circuit 50 detects that the difference voltage between the voltage V1 and reference voltage e1 is large; and it is detected that the value of output voltage VOUT is off a target voltage value.

When it is determined that error output voltage VOP is not within the normal operating range ranging from the minimum voltage value (1.0V) to the maximum voltage value (2.0V) of the triangular-wave signal VS, the control method for step-down DC-DC converters 10 can implement the following: it is detected that the difference voltage between the voltage V1 and reference voltage e1 is large; and it is detected that the value of output voltage VOUT is off a target voltage value.

In the step-down DC-DC converter 10 in this embodiment and the control method therefor, the following is detected upstream of the control circuit 20 by the logic circuit 50: error output voltage VOP is not within the normal operating range ranging from the minimum voltage value (1.0V) to the maximum voltage value (2.0V) of the triangular-wave signal VS. Therefore, that the value of output voltage VOUT is off a target voltage value can be more swiftly detected than in the following cases: cases where it is detected downstream of the control circuit 20 that error output voltage VOP is not within the normal operating range ranging from the minimum voltage value (1.0V) to the maximum voltage value (2.0V) of the triangular-wave signal VS.

When error output voltage VOP is continuously out of the normal operating range ranging from the minimum voltage value (1.0V) to the maximum voltage value (2.0V) of the triangular-wave signal VS, the step-down DC-DC converter 10 in this embodiment can implement the following: the counter 70 of the logic circuit 50 continuously detects that the difference voltage between the voltage V1 and reference voltage e1 is large; and it detects that the value of output voltage VOUT continuously disagrees with a target voltage value. In the step-down DC-DC converter 10, it can be detected that the resistor R1 or R2, feedback capacitor C2, feedback resistor R3, or the like has come off and output voltage VOUT is not normally controlled to a target voltage. When error output voltage VOP is continuously within the normal operating range ranging from the minimum voltage value (1.0V) to the maximum voltage value (2.0V) of the triangular-wave signal VS, the step-down DC-DC converter 10 can implement the following: the counter 70 detects that the value of output voltage VOUT is controlled and kept at a target voltage.

When error output voltage VOP is continuously out of the normal operating range ranging from the minimum voltage value (1.0V) to the maximum voltage value (2.0V) of the triangular-wave signal VS, the control method for step-down DC-DC converters 10 can implement the following: it is continuously detected that the difference voltage between the voltage V1 and reference voltage e1 is large; and it is detected that the value of output voltage VOUT continuously disagree with a target voltage value. When error output voltage VOP is continuously within the normal operating range ranging from the minimum voltage value (1.0V) to the maximum voltage value (2.0V) of the triangular-wave signal VS, this control method for step-down DC-DC converters 10 can implement the following: it is detected that the value of output voltage VOUT is controlled and kept at a target voltage.

The step-down DC-DC converter 10 in this embodiment is so constructed that the following is implemented: the D flip-flop circuits (D-FF1 to D-FF3) are connected in series over three stages, and the timing signal S5 is inputted to the clock terminals (CL1 to CL3). Thus, the D flip-flop circuit D-FF2 and the D flip-flop circuit D-FF3 store signals outputted from the D flip-flop circuit D-FF1 and D flip-flop circuit D-FF2, respectively, in the preceding stages in every period of the timing signal S5. Then, they output the signals to their respective subsequent stages. For example, when error output voltage VOP is not within the normal operating range ranging from the minimum voltage value (1.0V) to the maximum voltage value (2.0V) of the triangular-wave signal VS and the OR gate circuit OR1 of the window comparator 60 continuously outputs a high-level signal at least for three oscillation periods of the triangular-wave oscillator 32, the following takes place: this high-level signal is moved from one D flip-flop circuit to another (D-FF1 to D-FF3) in sequence, and is inputted to the AND gate circuit AND2. In addition, in this step-down DC-DC converter 10, the AND gate circuit AND2 outputs the logical product of the signals outputted by all the D flip-flop circuits (D-FF1 to D-FF3). When all the D flip-flop circuits (D-FF1 to D-FF3) output a high-level signal, for example, the AND gate circuit AND2 outputs an anomaly detection signal ERR of high level. When error output voltage VOP is not within the normal operating range ranging from the minimum voltage value (1.0V) to the maximum voltage value (2.0V) of the triangular-wave signal VS at least for three oscillation periods of the triangular-wave oscillator 32, this step-down DC-DC comparator 10 and this control method for DC-DC comparators can implement the following: an anomaly detection signal ERR of high level is outputted, and it is detected that the value of output voltage VOUT continuously disagrees with a target voltage value.

Also, when the resistor R1 or resistor R2 illustrated in FIG. 1 comes off, in the step-down DC-DC converter 10 in this embodiment, the logic circuit 50 outputs an anomaly detection signal ERR. Here, description will be omitted with respect to the same control method for step-down DC-DC converters 10 as described above. When the resistor R1 comes off, for example, output voltage VOUT is not normally fed back and voltage V1 drops. In this case, the error output voltage VOP becomes higher than reference voltage e2 (2.0V). Therefore, the logic circuit 50 determines that the error output voltage VOP is higher than the maximum voltage value (2.0V) of the triangular-wave signal VS. Then, it outputs an anomaly detection signal ERR of high level to the above-mentioned start-and-stop circuit 31.

When the resistor R2 comes off, for example, output voltage VOUT is not divided, and thus voltage V1 rises. In this case, error output voltage VOP becomes lower than reference voltage e3 (1.0V). For this reason, the logic circuit 50 determines that the error output voltage VOP is lower than the minimum voltage value (1.0V) of the triangular-wave signal VS. Then, it outputs an anomaly detection signal ERR of high level to the above-mentioned start-and-stop circuit 31.

The invention is not limited to the above-mentioned first embodiment, and, when it is embodied, part of its construction can be modified as appropriate without departing from the subject matter of the invention. In the drawings used in connection with the following description, the same members as in the embodiment described above will be marked with the same reference numerals. For example, the AND gate circuit AND2 need not output an anomaly detection signal ERR to the start-and-sop circuit 31, and it may output the signal to the error amplifier ERA1 or the PWM comparator 40. For example, the PWM comparator 40 may operate as follows. When an anomaly detection signal ERR is inputted, it outputs a low-level PWM signal to the main switching transistor FET1. It thereby turns off the main switching transistor FET1 and zeros the output voltage VOUT. As a result, unstable operation in which output voltage VOUT fluctuates can be prevented from continuing.

In the first embodiment, the window comparator 60 determines the following by a logical OR signal outputted by the OR gate circuit OR1: that error output voltage VOP is higher than reference voltage e2 (2.0V) and/or lower than reference voltage e3 (1.0V). Instead, the following construction may be adopted: the window comparator is not provided with the OR gate circuit OR1, and it outputs the results obtained by comparing the error output voltage VOP with reference voltage e2 and/or reference voltage e3; it is thereby determined that the error output voltage VOP is higher than reference voltage e2 (2.0V) and/or lower than reference voltage e3 (1.0V). Thus, when the error output voltage VOP alternately becomes higher than reference voltage e2 and lower than reference voltage e3, an oscillation phenomenon in which a voltage value oscillates has occurred. Therefore, this window comparator and the control method therefor can detect that an oscillation phenomenon has occurred in the following cases: when that error output voltage VOP is higher than reference voltage e2 and that it is lower than reference voltage e3 are alternately detected.

In the above-mentioned embodiment, the window comparator 60 has two comparators COMP1 and COMP2. Instead, it may have one comparator (COMP1 or COMP2). This window comparator and the control method therefor can determine that error output voltage VOP is not higher than reference voltage e2 and/or not lower than reference voltage e3. When it is detected that error output voltage VOP is not higher than reference voltage e2 and/or not lower than reference voltage e3, it can be detected that the value of output voltage VOUT is quite different from a target voltage.

Figure 4:
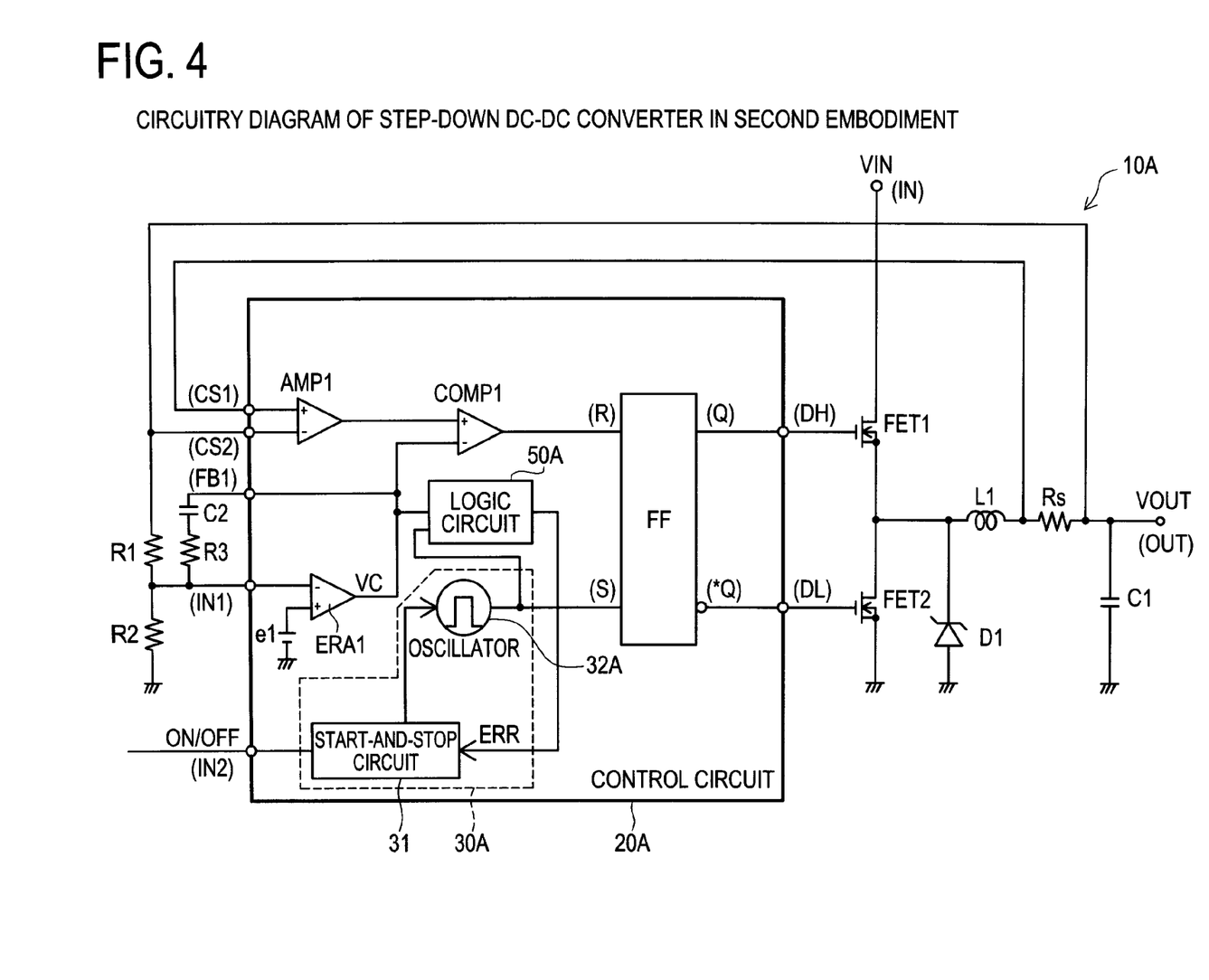
FIG. 4 is a circuitry diagram of a step-down DC-DC converter in a second embodiment.

The step-down DC-DC converter 10A illustrated in FIG. 4 is an example of current-controlled DC-DC converter. This step-down DC-DC converter 10A is provided with a square-wave oscillator 32A in place of the above-mentioned triangular-wave oscillator 32. A logic circuit 50A counts the duration of abnormal voltage in the error output voltage VC of the error amplifier ERA1, using the square-wave oscillator 32A. Then, it outputs an anomaly detection signal ERR to the start-and-stop circuit 31.

Figure 5:
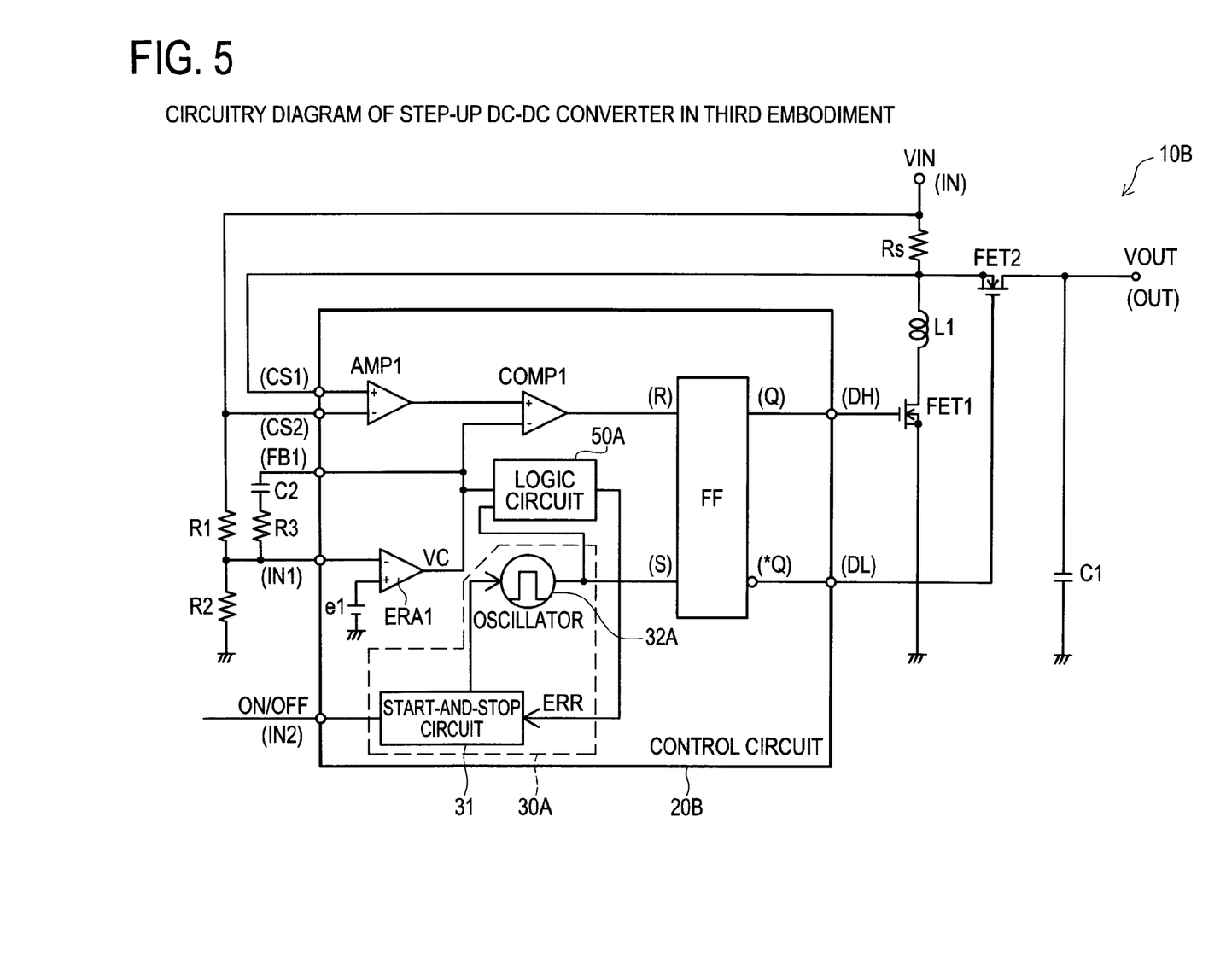
FIG. 5 is a circuitry diagram of a step-up DC-DC converter in a third embodiment.
Figure 6:
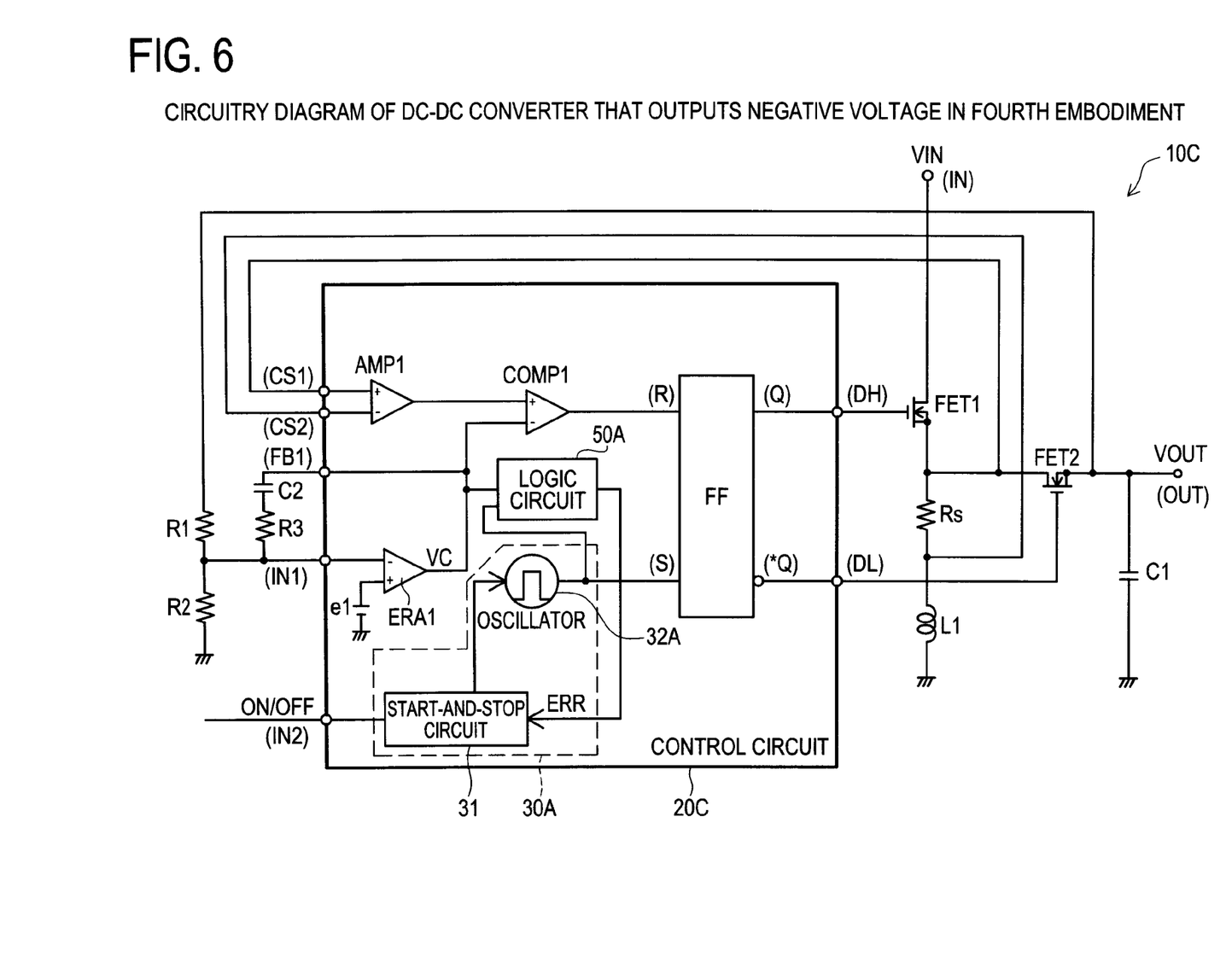
FIG. 6 is a circuitry diagram of a DC-DC converter that outputs negative voltage in a fourth embodiment.

The invention is applicable not only to a step-down DC-DC converter but also to a step-up DC-DC converter 10B and a DC-DC converter 10C that outputs negative voltage as illustrated in FIG. 5 and FIG. 6.

With the control circuit for DC-DC converters and the control method therefor according to the invention, it can be detected that output voltage is an abnormal voltage beyond a control range based on the following: that the difference voltage between reference voltage and detecting voltage detected according to output voltage is subjected to error amplification; and that an error output signal obtained as the result of error amplification stays at a predetermined voltage level.

What is claimed is:

1. A control circuit for DC-DC converters, comprising: an error amplifier that has an inverting input terminal to which detecting voltage detected according to output voltage is inputted and a non-inverting input terminal to which reference voltage is inputted, and amplifies the voltage difference of the detecting voltage relative to the reference voltage; and a detection unit that detects that an error output signal of the error amplifier stays at a predetermined voltage level, the detection unit having a signal determination unit that detects that the predetermined voltage level is out of a normal operating range, and a duration count unit that detects that the predetermined voltage level continuously stays out of the normal operating range for a predetermined time by the signal determination unit.

2. The control circuit for DC-DC converters, according to claim 1, wherein the signal determination unit has at least either of a first comparison unit that compares the predetermined voltage level with the maximum level of the normal operating range and thereby detects that the predetermined voltage level is higher than the maximum level, and a second comparison unit that compares the predetermined voltage level with the minimum level of the normal operating range and thereby detects that the predetermined voltage level is lower than the minimum level.

3. The control circuit for DC-DC converters, according to claim 1,
wherein the duration count unit is constructed of a plurality of flip-flops to which a clock signal is inputted and an AND circuit that carries out logic operation AND on the output signals of the individual flip-flops, and
wherein the flip-flops sequentially acquire an output signal from the signal determination unit in synchronization with the clock signal.

4. The control circuit for DC-DC converters, according to claim 2,
wherein the signal determination unit has the first comparison unit and the second comparison unit, and the signal determination unit alternately detects that the predetermined voltage level is higher than the maximum level and that the predetermined voltage level is lower than the minimum level.

5. A control method for DC-DC converters,
wherein, after detecting voltage detected according to output voltage is compared with reference voltage, an error output signal obtained by amplifying the difference voltage of the detecting voltage relative to the reference voltage is outputted, and
wherein it is detected that the error output signal stays at a predetermined voltage level, it is determined that the predetermined voltage level is out of a normal operating range, and it is detected that the predetermined voltage level is continuously out of the normal operating range for a predetermined time.

6. The control method for DC-DC converters, according to claim 5,
wherein the predetermined voltage level is compared with the maximum level of the normal operating range to detect that the predetermined voltage level is higher than the maximum level, and/or the predetermined voltage level is compared with the minimum level of the normal operating range to detect that the predetermined voltage level is lower than the minimum level.

7. The control method for DC-DC converters, according to claim 5,
wherein signals related to the result of detection of at least either of that the predetermined voltage level is higher than the maximum level and that the predetermined voltage level is lower than the minimum level are acquired in sequence in synchronization with a clock signal, and a plurality of the acquired signals are subjected to logic operation AND.

8. The control method for DC-DC converters, according to claim 6, wherein that the predetermined voltage level is higher than the maximum level and that the predetermined voltage level is lower than the minimum level are alternately detected.

* * * * *